United States Patent

Sugata et al.

[11] Patent Number: 5,052,767
[45] Date of Patent: Oct. 1, 1991

[54] OPTICAL BEAM SCANNING SYSTEM

[75] Inventors: Takeshi Sugata; Junichi Oka; Kenji Kawai, all of Hikone, Japan

[73] Assignee: Dainippon Screen Mfg. Co., Ltd., Japan

[21] Appl. No.: 427,194

[22] Filed: Oct. 25, 1989

[30] Foreign Application Priority Data

Oct. 25, 1988 [JP] Japan .................. 63-270494

[51] Int. Cl.$^5$ .......................................... G02B 26/08
[52] U.S. Cl. ................................ 359/206; 359/217; 359/216
[58] Field of Search .............. 350/6.1, 6.5, 6.6, 6.7, 350/6.8, 6.9, 6.91, 486, 420, 416, 432–433; 250/236

[56] References Cited

U.S. PATENT DOCUMENTS 3,944,323  3/1976  Starkweather .............. 350/6.8
3,995,110  11/1976 Starkweather .............. 350/6.8
4,408,826  10/1983 Ike .............................. 350/6.8

Primary Examiner—Bruce Y. Arnold
Assistant Examiner—James Phan
Attorney, Agent, or Firm—Ostrolenk, Faber, Gerb & Soffen

[57] ABSTRACT

An optical beam scanning system is constructed with less optical elements. A light beam ($B_1$) of parallel rays passes through a first image-forming system ($L_1$). The first image-forming system consists of a cylindrical lens (2) having a refracting power in a direction equivalent to a main scanning direction (X) and a spherical convex lens (3). Focuses of the cylindrical lens and the spherical convex lens are within a prescribed allowance. A light beam ($B_{11}$) passing through the spherical lens has a character of parallel rays within a vertical plane and a character of convergent rays within a horizontal plane to be focused on a deflection surface ($4a$). A reflected light beam ($B_2$) is finally focused on a surface-to-be-scanned (8) through a second image-forming system ($L_2$).

8 Claims, 6 Drawing Sheets

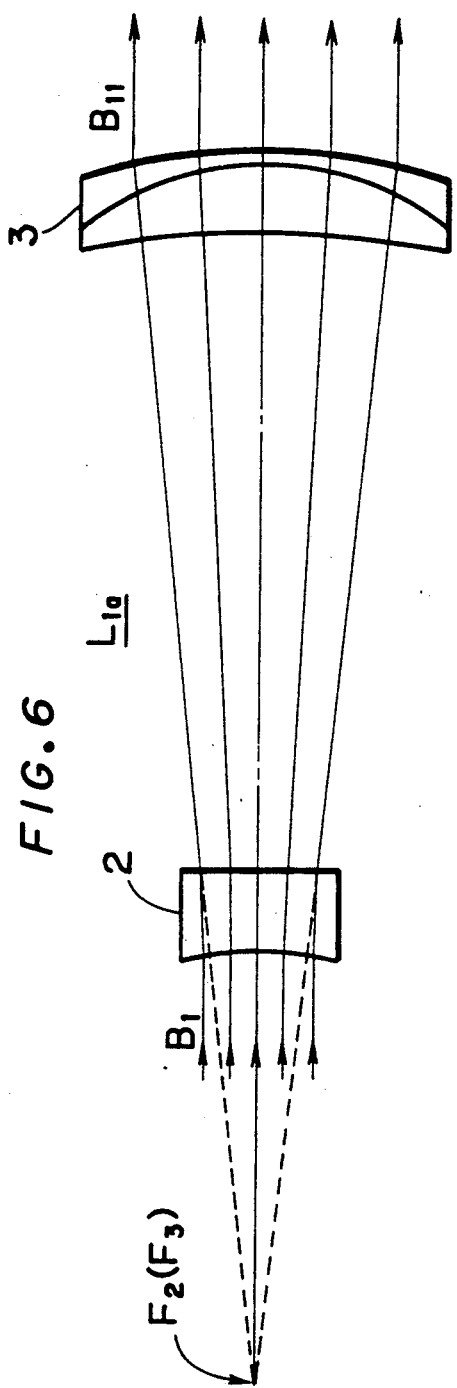
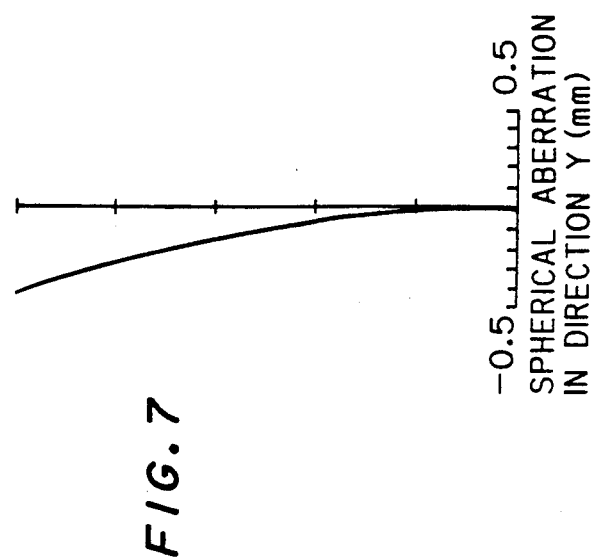

OPTICAL BEAM SCANNING SYSTEM

BACKGROUND OF THE INVENTION

1. Field of the Invention

The present invention relates to an optical beam scanning system comprising a deflector for deflecting a light beam from a light source and thereby scanning a surface-to-be-scanned by the deflected light beam.

2. Description of the Prior Art

FIG. 1 is a perspective view of an optical beam scanning system of the prior art. The optical beam scanning system comprises a light source 1, an optical beam modulator 1a (such as an acousto-optical modulator (AOM)), a first image-forming system $L_{10}$, a deflector 4, a second image-forming system $L_2$ and a recording drum 7. The image surface 8 of the recording drum 7 is to be scanned by a light beam $B_2$; a direction X on the surface 8 (perpendicular to the direction of rotation of the drum 7) is a main scanning direction and a circumferential direction Y is a subscanning direction.

The light source 1 emits a light beam $B_1$ of parallel rays. The light beam $B_1$ is subjected to ON/OFF control by the optical beam modulator 1a.

The light beam $B_1$ then passes through the first imaging-forming system $L_{10}$. The system $L_{10}$ consists of a beam expander 21 and a cylindrical lens 22. The beam expander 21 consists of two lenses A light beam $B_{1a}$ parallel rays is formed by the beam expander 21. Then, the light beam $B_{1a}$ passes through the cylindrical lens 22. The cylindrical lens 22 has a refracting power only along a vertical axis (equivalent to the subscanning direction Y). The focal length of the cylindrical lens 22 and a deflection as the distance surface 4a of the deflector 4. Consequently, the light beam $B_{1a}$ is focused on the deflection surface 4a along the vertical axis, but not along the horizontal axis.

The light beam is deflected by the deflector 4 and focused on the image surface 8 by the second image-forming system $L_2$. The deflector 4 is a rotary polygon mirror; the polygon mirror 4 has several mirror surfaces (or deflection surfaces) 4a. The mirror 4 rotates to deflect the light beam in the main scanning direction X. The second image-forming system $L_2$ consists of an $f\theta$ lens 5 and a cylindrical lens 6 having a refracting power along the vertical axis. The reflection surface 4a and the image surface 8 are at conjugate positions along the vertical axis of the image-forming system $L_2$.

The resolving power of the prior art optical beam scanning system is inversely proportional to the cross-sectional size of the light beam $B_{1a}$. That is, the resolving power of the overall system is increased by expanding the initial light beam $B_1$ to the light beam $B_{1a}$.

Further, the second image-forming system $L_2$ prevents scanning pitch irregularity in the subscanning direction Y. Such irregularity can be caused by a facet error such as inclination of the deflection surface 4a.

However, the prior art system has some disadvantages. The provision of the two lenses of the beam expander 21 increases the overall length of the optical path and increases the number of optical elements. This increases the cost of the first image-forming system $L_{10}$ and makes installation and arrangement of its optical elements more laborious.

SUMMARY OF THE INVENTION

The present invention relates to an optical beam scanning system, comprising: means for emitting a beam of parallel rays of light; a first optical system for converging the rays of light along a first axis and onto a deflector the first optical system including (a) a cylindrical lens which extends in the first axis and (b) a spherical convex lens having an object-side focal point essentially coincident with a focal point of the cylindrical lens, and an image-side focal point located at the deflector. The deflector for deflecting the beam along a second axis perpendicular to the first axis. The system further comprises a second optical system for focussing the beam deflected by the deflector onto a surface to be scanned.

According to the present invention, by omitting a beam expander, the optical path of an optical beam scanning system can be shortened and the number of optical elements can be decreased. Accordingly, installation and arrangement of the optical elements can be done less laboriously and the total cost of the optical beam scanning system can be decreased.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4, 6 and 8 are enlarged plan views of a first image-forming system according to preferred embodiments of the present invention; and FIGS. 5, 7 and 9 are graphs of spherical aberration on a deflection surface according to the preferred embodiments.

DETAILED DESCRIPTION OF THE PREFERRED EMBODIMENTS

Figure 2:
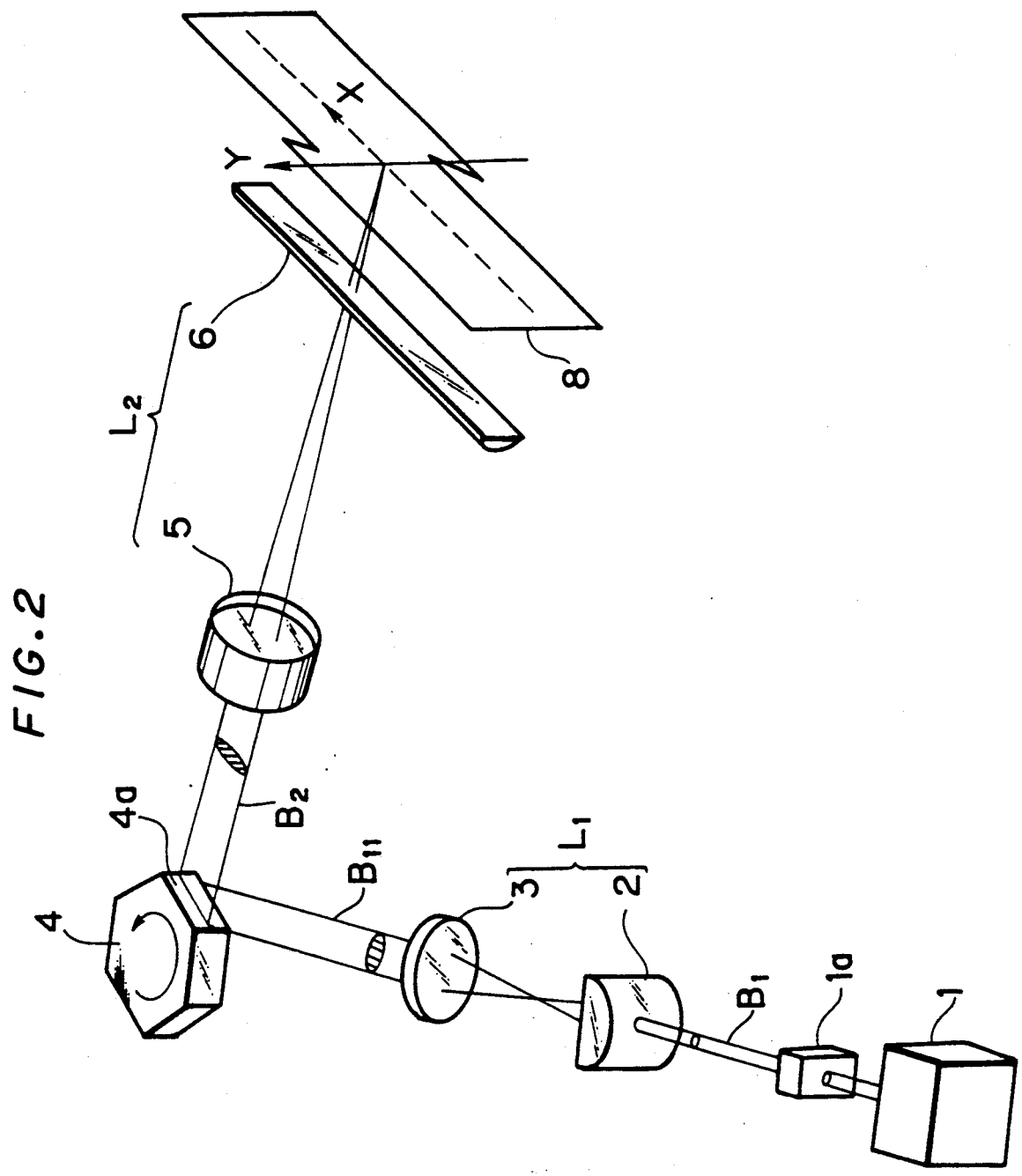
FIG. 2 is a perspective view of an optical beam scanning system according to the present invention.

The optical beam scanning system illustrated in FIG. 2 includes a light source 1, a light beam modulator 1a, a first image-forming system $L_1$, a deflector 4, a second image-forming system $L_2$ and an image surface 8. The first image-forming system $L_1$ consists of a cylindrical lens 2 and a spherical convex lens 3. The second image-forming system $L_2$ consists of an $f\theta$ lens 5 and a cylindrical lens 6.

Figure 3:
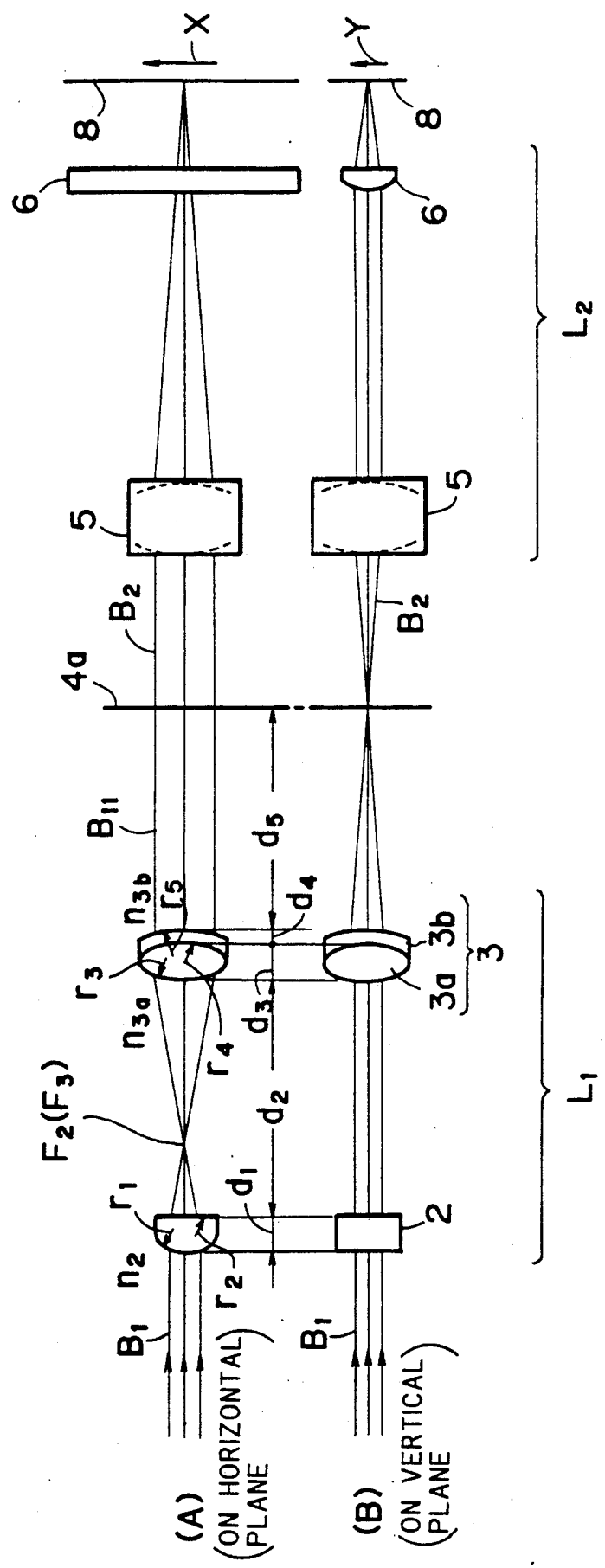
FIG. 3 is a schematic plan view and a schematic elevational view of the optical beam scanning system according to the present invention.

A column (A) of FIG. 3 is a schematic plan view of the optical beam scanning system and a column (B) of FIG. 3 is a schematic elevational view thereof. The light source 1 and the light beam modulator 1a are not illustrated in FIG. 3.

The cylindrical lens 2 of the first image-forming system $L_1$ has a positive refractive power along a horizontal axis (equivalent to a main scanning direction X on the image surface 8). The spherical convex lens 3 and the $f\theta$ lens 5 have positive refracting powers in every direction on a plane normal to the optical path of the optical beam scanning system. The cylindrical lens 6 of the second image-forming system $L_2$ has a refracting power along a vertical axis (equivalent to a subscanning direction Y on the image surface 8).

In FIG. 3 are shown radii $r_i$ of curved surfaces of the lenses 2 and 3, and distances $d_i$, where the subscript i is an integer from one to five. The radii $r_1$ and $r_2$ are defined for the object-side and the image-side surfaces of the cylindrical lens 2, respectively. The spherical convex lens 3 is a lens combined of first and second lenses 3a and 3b. The radii $r_3$ and $r_4$ are defined for the object-side and the image-side surfaces of the first lens 3a, respectively. The image-side surface of the first lens 3a corresponds to the object-side surface of the second lens 3b. The radius $r_5$ is defined for the image-side surface of the second lens 3b. The distance $d_1$ is the width of the cylindrical lens 2. The distance $d_2$ is a distance between the image-side surface of the cylindrical lens 2 and the object-side surface of the spherical lens 3. The distances $d_3$ and $d_4$ are the widths of the first and second lenses 3a and 3b, respectively. The distance $d_5$ is a distance between the image-side surface of the spherical lens 3 and a deflection surface 4a of the deflector 4.

The following table 1 shows values of parameters concerning the first image-forming system $L_1$ according to a first preferred embodiment of the present invention:

TABLE 1

| Radius (mm) | | Distance (mm) | | Refractive Index | | Focal Length (mm) | |
|---|---|---|---|---|---|---|---|
| $r_1$ | 6.56 | $d_1$ | 3.0 | $n_2$ | 1.51509 | $f_2$ | 12.74 |
| $r_2$ | ∞ | $d_2$ | 71.3 | $n_{3a}$ | 1.77748 | $f_3$ | 63.71 |
| $r_3$ | −80.73 | $d_3$ | 3.0 | $n_{3b}$ | 1.83957 | | |
| $r_4$ | −12.65 | $d_4$ | 0.5 | | | | |
| $r_5$ | −28.25 | $d_5$ | 65.0 | | | | |

The radius $r_i$ has a positive value when the center of its curvatures exists at the image side (or the right-hand side in FIG. 3) On the contrary, it has a negative value when its center exists at the object side. The values of the refractive indexes $n_2$, $n_{3a}$, $n_{3b}$ for respective lenses 2, 3a and 3b are defined for a laser beam having a wavelength of 633 nm. The focal lengths $f_2$ and $f_3$ are those of the cylindrical lens 2 and the spherical lens 3, respectively.

Figure 4:
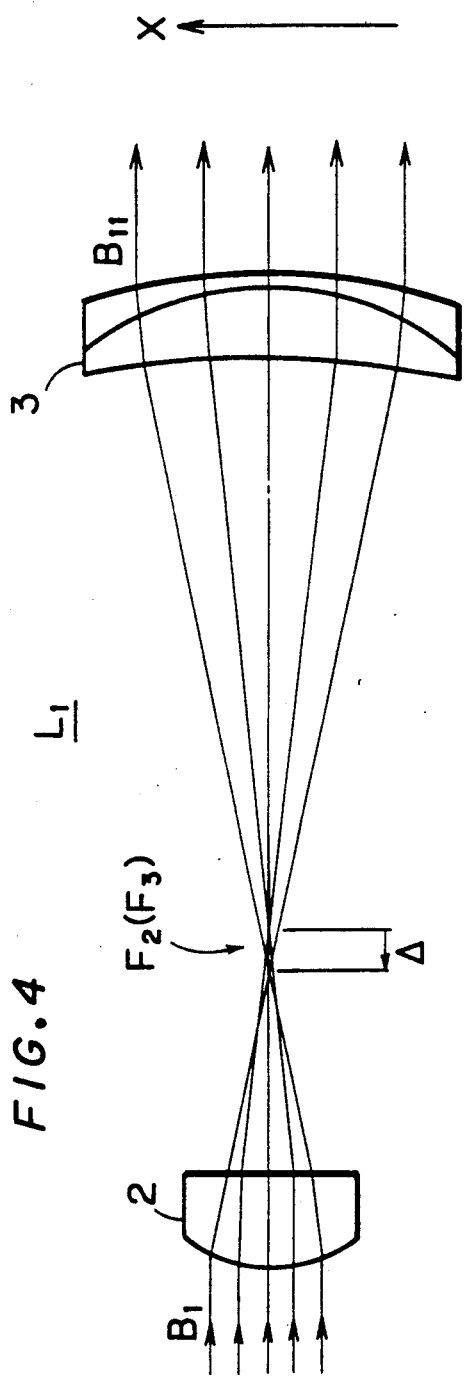

As illustrated in FIG. 4, the light beam $B_1$ of parallel rays, which is emitted from the light source 1 and subjected to ON/OFF control by the light beam modulator 1a, passes through the first image-forming system $L_1$. Because the cylindrical lens 2 has a positive power only along the main scanning direction, the light beam $B_1$ is converged (with respect to the horizontal axis) by the cylindrical lens 2 (col. (A) of FIG. 3). Even at the focal point $F_2$ of the cylindrical lens 2, the light beam $B_1$ behaves as parallel rays parallel to the optical axis.

The focal point $F_2$ of the cylindrical lens 2 is located within a prescribed allowance around a focal point $F_3$ of the spherical lens 3. Therefore, after passing through the spherical lens 3, a light beam $B_{11}$ behaves as parallel rays within a horizontal plane parallel to the optical axis and the main scanning direction X as shown in the column (A) of FIG. 3. The allowance is possibly one millimeter, preferably 50 μm, and more suitably 10 μm.

Because the focal length $f_3$ of the spherical lens 3 is greater than the focal length $f_2$ of the cylindrical lens 2, the width of the light beam $B_{11}$ across the horizontal plane is larger than that of the light beam $B_1$. In other words, the first image-forming system $L_1$ functions as an optical expansion system within the horizontal plane. The light beam $B_{11}$ converges within the vertical plane as shown in column (B) of FIG. 3.

As shown in FIG. 4, the cylindrical lens 2 has a negative spherical aberration Δ on the horizontal plane. On the other hand, the spherical convex lens 3 has a positive spherical aberration Δ equal to the negative spherical aberration Δ of the cylindrical lens 2. Therefore, the spherical aberrations cancel each other out. Accordingly, the light beam $B_{11}$ focuses on the deflection surface 4a without spherical aberration within the horizontal plane. Therefore, an image of a line is formed on the deflection surface 4a. The image of the line extends in the main scanning direction X without spherical aberration in the main scanning direction X.

Figure 5:
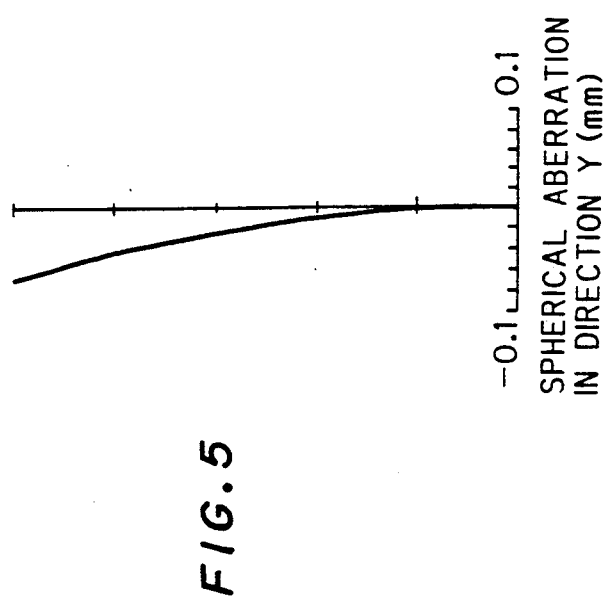

As shown in column (B) of FIG. 3, the light beam $B_1$ propagates toward the spherical lens 3 as parallel rays within the vertical plane. The deflection surface 4a is at the focal point of the spherical lens 3. The spherical lens 3 causes only a small amount of spherical aberration when parallel rays propagate into the lens 3a from the object side. FIG. 5 is a graph of the sagittal spherical aberration in the direction Y on the deflection surface 4a, that is, the transverse aberration. Consequently, the light beam $B_1$ is focused on the deflection surface 4a so as to form a lengthened linear image in the main scanning direction X, with very little spherical aberration in either the X direction or the Y direction.

After being deflected by the deflector 4, the light beam $B_2$ is focused on the image surface 8 by the second image-forming system $L_3$. As shown in column (A) of FIG. 3, the light beam $B_2$ has parallel rays within the horizontal plane. The cylindrical lens 6 has no refracting power in the main scanning direction X. Further, the image surface 8 corresponds to the focal plane of the fθ lens 5. Consequently, the light beam $B_2$ is focused on the image surface 8 in the main scanning direction X. On the other hand, as shown in column (B) of FIG. 3, the light beam $B_2$ is formed of parallel rays within the vertical plane after passing through the lens 5. Because the cylindrical lens 6 has a refracting power in the subscanning direction Y and is positioned so that the image surface 8 corresponds to the focal plane of the cylindrical lens 6, the light beam $B_2$ is focused on the image surface 8 in the subscanning direction Y. In other words, the deflection surface 4a and the image surface 8 are conjugate in the subscanning direction Y.

Figure 1:
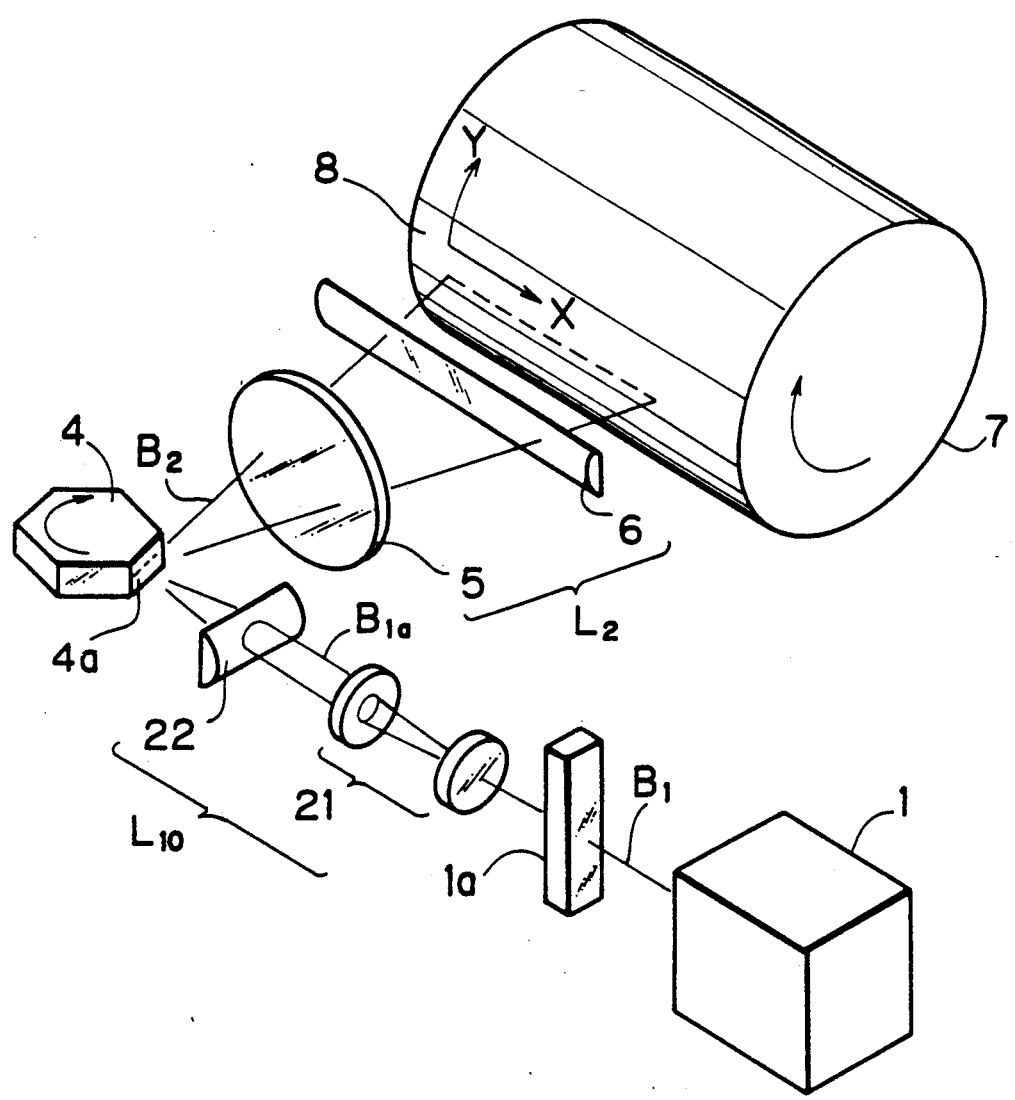
FIG. 1 is a perspective view of a prior art optical beam scanning system.

According to the first embodiment described above, the first image-forming system $L_1$ consists of fewer optical elements than that of the optical system $L_{10}$ shown in FIG. 1. Therefore, the optical path length can be shortened and the cost of the first image-forming system can be decreased.

Table 2 shows values of the parameters concerning the first image-forming system $L_{1a}$ according to a second preferred embodiment of the present invention.

TABLE 2

| Radius (mm) | | Distance (mm) | | Refractive Index | | Focal Length (mm) | |
|---|---|---|---|---|---|---|---|
| $r_1$ | 10.0 | $d_1$ | 3.0 | $n_2$ | 1.51509 | $f_2$ | −19.41 |
| $r_2$ | ∞ | $d_2$ | 23.8 | $n_{3a}$ | 1.77748 | $f_3$ | 48.53 |
| $r_3$ | −53.75 | $d_3$ | 3.0 | $n_{3b}$ | 1.83957 | | |
| $r_4$ | −10.58 | $d_4$ | 0.5 | | | | |
| $r_5$ | −21.05 | $d_5$ | 50.0 | | | | |

The negative value of the focal length $f_2$ indicates that the cylindrical lens 2 is a concave lens, that is, it has a negative refracting power. FIG. 6 is a plan view of the first image-forming system $L_{1a}$ according to the second embodiment. The focal point $F_2$ of the cylindrical lens 2 is located within the prescribed allowance from the focal point $F_3$ of the spherical lens 3. The first image-forming system $L_{1a}$ of FIG. 6 is equivalent to that of FIG. 4. FIG. 7 is a graph of the spherical aberration in the direction Y on the deflection surface 4a.

As in the first embodiment, a linear image of the light beam B₁ is focused on the deflection surface 4a. The image is lengthened along the main scanning direction X and there is very little spherical aberration in either of the directions X and Y.

Figure 8:
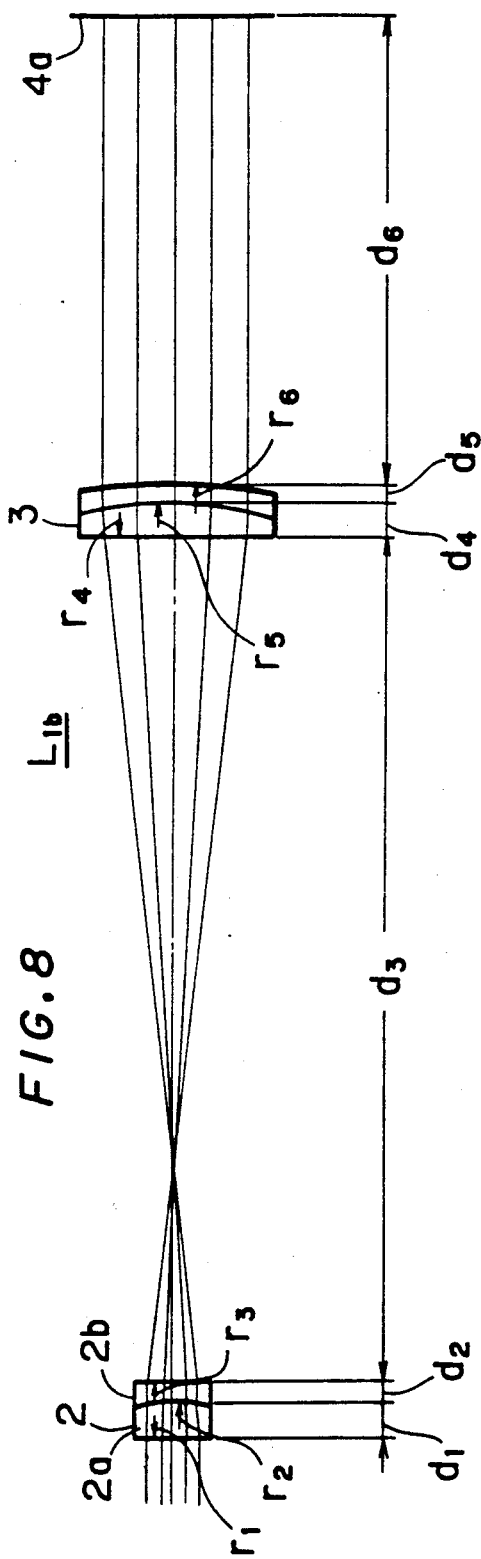

FIG. 8 is a plan view of the first image-forming system L₁b according to a third embodiment of the present invention. The cylindrical lens 2 consists of two lenses 2a and 2b, and has a positive power as a whole. The definition of the radii $r_1$–$r_6$ and distances $d_1$–$d_6$ are different from that for the first and second embodiments shown in FIG. 3. Table 3 shows values of the parameters concerning the first image-forming system L₁b according to the third embodiment.

TABLE 3

| Radius (mm) | | Distance (mm) | | Refractive Index | | Focal Length (mm) | |
|---|---|---|---|---|---|---|---|
| $r_1$ | 30.20 | $d_1$ | 3.0 | $n_{2a}$ | 1.83957 | $f_2$ | 29.47 |
| $r_2$ | −9.66 | $d_2$ | 1.0 | $n_{2b}$ | 1.77748 | $f_3$ | 59.78 |
| $r_3$ | ∞ | $d_3$ | 85.0 | $n_{3a}$ | 1.51509 | | |
| $r_4$ | 119.92 | $d_4$ | 3.0 | $n_{3b}$ | 1.61656 | | |
| $r_5$ | −13.28 | $d_5$ | 1.0 | | | | |
| $r_6$ | −30.62 | $d_6$ | 59.4 | | | | |

Figure 9:
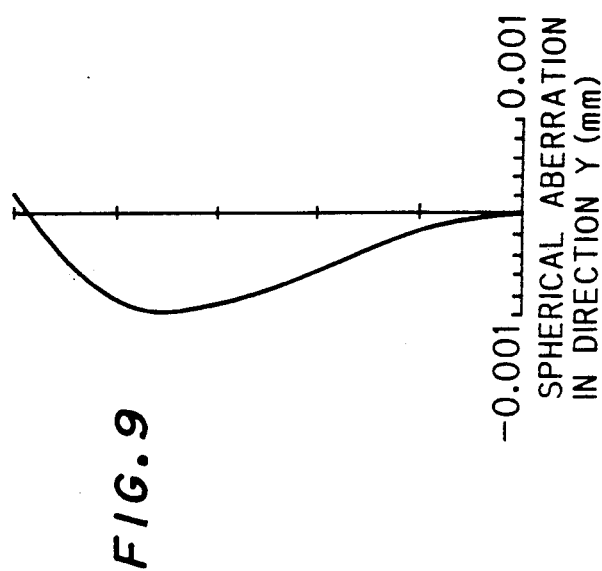

FIG. 9 is a graph of the spherical aberration in the Y direction on the deflection surface 4a according to the third embodiment.

The spherical aberration of the cylindrical lens 2 is reduced by combining two lenses 2a and 2b. The spherical aberration of the spherical lens 3 is also kept very small. Consequently, the spherical aberration on the deflection surface 4a can be reduced as shown in FIG. 9.

In the above embodiments, the focal length of the spherical lens 3 is larger than that of the cylindrical lens 2 so that the first image-forming system functions as an optical expansion system by which the light beam B₁ is expanded in the main scanning direction X. However, the first image-forming system need not be constructed as an optical expansion system. For example, when a semiconductor laser is employed as the light source, relatively thick parallel rays can be obtained by setting a collimator lens at the outlet of the semiconductor laser; this negates the necessity of an optical expansion system.

Although the present invention has been described and illustrated in detail, it is clearly understood that the same is by way of illustration and example only and is not to be taken by way of limitation. The spirit and scope of the present invention should be limited only by the terms of the appended claims

What is claimed is:

1. An optical beam scanning system, comprising:
   (A) means for emitting a beam of parallel rays of light;
   (B) a first optical system for converging the rays of light onto a deflector along a first axis, the first optical system including (a) a cylindrical lens which extends along the first axis and (b) a spherical convex lens having an object-side focal point essentially coincident with a focal point of the cylindrical lens, and an image-side focal point located at the deflector;
   (C) the deflector for deflecting the beam along a second axis being perpendicular to the first axis; and
   (D) a second optical system located along the second axis for focussing the beam deflected by the deflector onto a surface to be scanned.

2. An optical beam scanning system in accordance with claim 1, wherein the object-side focal point of the spherical convex lens and the focal point of the cylindrical lens are separated by a distance of no greater than one millimeter.

3. An optical beam scanning system in accordance with claim 1, wherein the cylindrical lens has a positive refracting power.

4. An optical beam scanning system in accordance with claim 1, wherein the second optical system includes an Fθ lens and a cylindrical lens, the cylindrical lens extending along the second axis.

5. An optical beam scanning system in accordance with claim 4, wherein the deflector is a rotary polygon mirror.

6. An optical beam scanning system, comprising:
   (A) means for emitting a beam of parallel rays of light;
   (B) a first optical system for converging the rays of light along a first axis and onto a deflector, the first optical system including (1) a cylindrical lens which extends along the first axis and (2) a spherical convex lens having an object-side focal point essentially coincident with a focal point of the cylindrical lens, and an image-side focal point located at the deflector, the object-side focal point of the spherical convex lens and the focal point of the cylindrical lens being separated by a distance of no greater than one millimeter, the cylindrical lens having a focal length which is no greater than the focal length of the spherical convex lens;
   (C) the deflector for deflecting the beam along a second axis being perpendicular to the first axis; and
   (D) a second optical system located along the second axis for focussing the beam deflected by the deflector onto a surface to be scanned.

7. An optical beam scanning system in accordance with claim 6, wherein the cylindrical lens has a spherical aberration which is opposite in sign to the spherical aberration of the spherical convex lens.

8. An optical beam scanning system, comprising:
   (A) means for emitting a beam of parallel rays of light;
   (B) a first optical system for converging the rays of light onto a deflector along a first axis, the first optical system including (a) a cylindrical lens which extends along the first axis and (b) a spherical convex lens having an object-side focal point essentially coincident with a focal point of the cylindrical lens, and an image-side focal point located at the deflector, the cylindrical lens having a negative refracting power;
   (C) the deflector for deflecting the beam along a second direction being perpendicular to the first direction; and
   (D) a second optical system located along the second axis for focussing the beam deflected by the deflector onto a surface to be scanned.

* * * * *